United States Patent

Herreman et al.

[11] Patent Number: 5,965,851
[45] Date of Patent: *Oct. 12, 1999

[54] ACOUSTICALLY INSULATED APPARATUS

[75] Inventors: Kevin M. Herreman, Newark; Gerald Greaves, Granville, both of Ohio

[73] Assignee: Owens Corning Fiberglas Technology, Inc., Summit, Ill.

[ * ] Notice: This patent issued on a continued prosecution application filed under 37 CFR 1.53(d), and is subject to the twenty year patent term provisions of 35 U.S.C. 154(a)(2).

[21] Appl. No.: 08/789,863

[22] Filed: Jan. 28, 1997

[51] Int. Cl.$^6$ .................................................. G10K 11/04
[52] U.S. Cl. .......................... 181/200; 181/202; 181/290
[58] Field of Search ..................... 181/200, 202, 181/204, 205, 284, 286, 287, 290, 294; 428/68; 312/228, 400, 406, 408

[56] References Cited

U.S. PATENT DOCUMENTS

| | | |
|---|---|---|
| 2,160,729 | 5/1939 | Graham et al. . |
| 2,221,499 | 11/1940 | Torri . |
| 2,556,884 | 6/1951 | Muller . |
| 2,636,543 | 4/1953 | Groskopf . |
| 2,880,471 | 4/1959 | Von Munchhausen . |
| 3,092,203 | 6/1963 | Slayter et al. . |
| 3,273,297 | 9/1966 | Wehe, Jr. . |
| 3,506,088 | 4/1970 | Sherman . |
| 3,658,633 | 4/1972 | Jumentier et al. . |
| 3,950,207 | 4/1976 | De Zuloaga Amat . |
| 4,133,932 | 1/1979 | Peck . |
| 4,204,022 | 5/1980 | Snyder et al. . |
| 4,258,821 | 3/1981 | Wendt et al. . |
| 4,287,263 | 9/1981 | Woodring et al. . |
| 4,349,590 | 9/1982 | Bolen et al. . |
| 4,357,377 | 11/1982 | Yamamoto . |
| 4,381,200 | 4/1983 | Bolen et al. . |
| 4,594,278 | 6/1986 | Nixon et al. . |
| 4,696,847 | 9/1987 | Cousin et al. . |
| 4,777,086 | 10/1988 | Madden et al. . |
| 4,991,406 | 2/1991 | Fujii et al. . |
| 5,044,705 | 9/1991 | Nelson ..................................... 312/228 |
| 5,094,318 | 3/1992 | Maeda et al. . |
| 5,211,988 | 5/1993 | Morton . |
| 5,240,527 | 8/1993 | Lostak et al. . |
| 5,274,200 | 12/1993 | Das et al. . |
| 5,432,306 | 7/1995 | Pfordresher . |
| 5,665,447 | 9/1997 | Greaves et al. .......................... 181/290 |

*Primary Examiner*—Khanh Dang
*Attorney, Agent, or Firm*—Stephen W. Barns

[57] ABSTRACT

An acoustically insulated apparatus is disclosed which includes a machine and an acoustical insulation system for the machine, wherein the machine generates noise having a peak sound frequency. The insulation system includes a two-part stratum having a porous sound absorbing media layer, and a sound reflecting barrier layer located between the sound absorbing layer and the machine, wherein the two-part stratum exhibits maximum sound absorption at the peak sound frequency.

20 Claims, 3 Drawing Sheets

ACOUSTICALLY INSULATED APPARATUS

CROSS-REFERENCE TO RELATED APPLICATIONS

The following applications are to some extent related to the instant invention: Ser. No. 08/544,687 filed Oct. 18, 1995, Ser. No. 08/742,191 filed Oct. 31, 1996, Ser. No. 08/706,106 filed Aug. 30, 1996, and Ser. No. 08/706,149 filed Aug. 30, 1996.

TECHNICAL FIELD AND INDUSTRIAL APPLICABILITY OF THE INVENTION

This invention relates in general to acoustically insulated apparatuses that include a machine and an acoustical insulation for the machine. More particularly, this invention pertains to acoustically insulated apparatuses including a machine generating noise at a peak sound frequency, and an acoustical insulation system exhibiting maximum sound absorption at the peak sound frequency.

BACKGROUND OF THE INVENTION

Appliances and other machines that generate noise are usually provided with acoustical insulation to reduce the levels of sound emanating from the machines. The unwanted sound from these machines can be caused both by the mechanical operation of the motor within the machine, such as the compressor motor within an air conditioner, and by the vibration of the machine itself. In a residential dwelling, excessive noise may be generated by dishwashers, clothes washers and clothes dryers, which can be annoying to inhabitants of the dwelling.

Conventional acoustical treatments for machines generally comprises sound transmission barriers and sound absorption layers. One form of acoustical insulation involves enclosing the noise source in an insulation structure. A typical form of acoustical insulation is a layer of mineral fiber insulation, such as fiberglass insulation, wrapped around or positioned around the source of unwanted noise. For example, a fiberglass absorber is usually incorporated in the front door panel of an under-the-counter dishwasher. The blanket of glass fibers absorbs some of the sound energy entering the fiberglass board, thereby resulting in a reduced transmission of unwanted sound from the source of sound in the appliance. Further, it is known that the insertion of a reflecting sound barrier within the acoustical insulation also reduces the sound transmission through the insulation product. Reflecting sound barriers in the past have been made of paper and also of a thin layer of polymeric material, as well as of other materials such as asphalt. U.S. Pat. No. 5,094,318 to Maeda et al. discloses a sound absorption material for automobiles which includes a damping layer, which may act as a sound reflection barrier, a sound absorption layer which absorbs acoustical energy, and a surfacing materiel. The damping layer can be purely asphalt, or an asphalt modified with resins and polymers. The sound absorption layer can be a foamed material or a fibrous material such as a mineral fiber blanket.

Merely applying a layered insulation and sound barrier laminate to noise producing equipment has been found to provide unsatisfactory acoustical performance for many noise sources. The insulation material often has inadequate insulating capability for the level of sound energy under consideration, since many appliances and other noise producing machines have limited space for applying acoustical insulation. Further, insulation materials are not usually designed with specific noise sources in mind, and typical acoustical insulation does not address the particular acoustical or tonal characteristics of the source of the unwanted noise.

It would therefore be desirable for an apparatus that includes a noise generating machine to include an acoustical insulation system that would be suitable for effectively acoustically insulating the machine, and could be easily manufactured and installed. It would further be desirable for the apparatus to include an insulation system that exhibits maximum sound absorption at a peak sound frequency of the machine.

SUMMARY OF THE INVENTION

The above object as well as other objects not specifically enumerated are achieved by an acoustically insulated apparatus comprising a machine and an acoustical insulation system for the machine, wherein the machine generates noise having a peak sound frequency. The insulation system includes a two-part stratum having a porous sound absorbing media layer, and a sound reflecting barrier layer located between the sound absorbing layer and the machine, wherein the two-part stratum exhibits maximum sound absorption at the peak sound frequency.

The objects of the invention are also achieved by an acoustically insulated apparatus, comprising a machine and an acoustical insulation system for the machine, wherein the machine generates noise having first and second peak sound frequencies. The insulation system includes a first two-part stratum which includes a first sound absorbing media layer and a first sound reflecting barrier layer located between the first sound absorbing layer and the machine, and a second two-part stratum located between the first two-part stratum and the machine and including a second sound absorbing media layer and a second sound reflecting barrier layer located between the second sound absorbing layer and the machine. The insulation system exhibits maximum sound absorption at the first and second peak sound frequencies.

DETAILED DESCRIPTION AND PREFERRED EMBODIMENTS OF THE INVENTION

Figure 1:
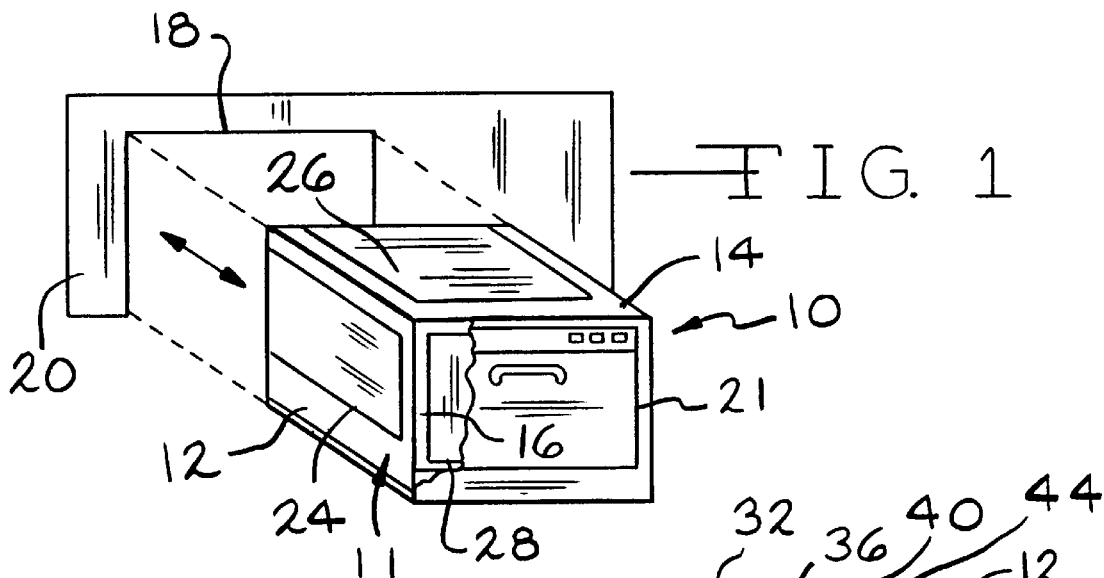
FIG. 1 is a schematic view in perspective of an acoustically insulated apparatus of the present invention.

Referring now to the drawings, FIG. 1 illustrates an acoustically insulated apparatus of the present invention, including a machine such as a dishwasher 10 provided with an acoustical insulation system. The dishwasher has a tub 11 consisting of side walls 12 and a top wall 14. The tub has a front door 16 which can be opened for access to the interior of the tub. The dishwasher is designed to be inserted into cavity 18 in the kitchen cabinet 20. In FIG. 1 the door is partially cut away to illustrate that there is an exterior panel 21 on the dishwasher door. The insulation system of the invention is shown in the form of side insulation panel 24, top insulation panel 26 and front insulation panel 28. Similar panels, not shown, can be provided on the other side of the dishwasher and on other dishwasher faces. Although the insulation panels 24, 26 and 28 are shown as individual pieces or elements, it is to be understood that these panels could be formed as one piece or in any other configuration suitable for providing acoustical insulation for the dishwasher or other machine to be acoustically insulated.

Figure 2:
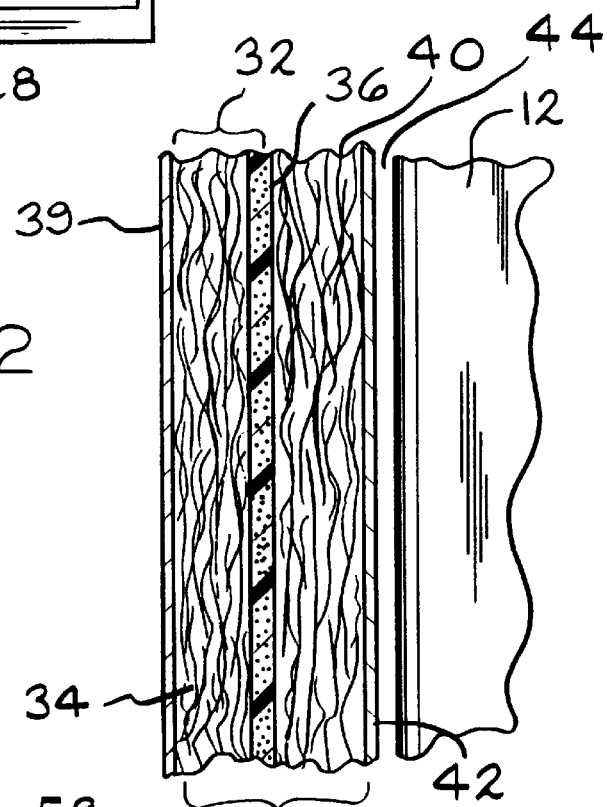
FIG. 2 is schematic cross-sectional view in elevation of a portion of the apparatus of FIG. 1.

As shown in FIG. 2, the side insulation panel 24 includes a two-part stratum 32 which is comprised of a porous sound absorbing fiberglass layer 34 and a sound reflecting barrier in the form of asphalt layer 36. As described hereinbelow, the two-part stratum 32 is tuned or tonal specific, which means that it is designed to provide its maximum sound absorption at a specific frequency or within a specific frequency range or band. In this manner, the two-part stratum 32 can be designed to be particularly effective in absorbing sound at the frequency which is the peak frequency of the noise emanating from the tub 11 or other machine. The reduction in sound transmission by absorption can be measured in sabines using the standard ASTM method E-1050. Noise absorption is measured on a scale from zero, meaning no sound is absorbed, to 1.0, meaning all the sound is absorbed.

The amount of sound transmitted through an object can be measured by a Sound Transmission Class ("STC") according to the standard ASTM method E90-90. The STC is measured on a scale in decibels, from zero decibels, meaning all the sound is transmitted, to approximately 70 decibels, meaning almost no sound is transmitted. The STC is a single number that represents the ratio of sound energy incident on or striking an object relative to the sound energy transmitted through the object. Usually the STC is measured over a range of frequencies. The STC for the acoustical insulation system of the invention is preferably within the range of from about 10 to about 50 decibels, and more preferably within the range of from about 20 to about 40 decibels.

Although the sound absorbing layer 34 is illustrated as a fiberglass layer, the porous sound absorbing media layer can be any layer of sound absorbing material, such as a layer of foam material. Besides glass fibers, such fibers as other mineral fibers and organic fibers can be used. In automotive sound insulation applications, for example, the preferred insulation fibers may be polyester fibers or polypropylene fibers. It is believed that fibrous insulation materials are effective because the fibers therein tend to refract sound waves across the numerous air pockets contained in the material, which air pockets act to impede or dampen and thus lessen the sound energy. Typically, a fibrous glass insulation material has between about 5% and about 10% by weight of a phenolic resin binder such as phenol-urea-formaldehyde. The binder enhances the tensile strength of the fiberglass. Preferred fiberglass insulating materials are commercially available from Owens Corning, Toledo, Ohio.

Although the sound reflecting barrier is disclosed above as being asphalt, numerous other materials could also be applied to the insulation layer 34 to provide a solid barrier for sound transmission through the product. For example, the sound reflecting barrier could be a thermoplastic adhesive such as a hot melt polymeric material, an example of which is hot melt adhesive No. 50-823, from Reynolds Adhesive, Greenville, S.C. The sound reflecting barrier could also be a thermoset adhesive, such as an epoxy adhesive. Other examples include water-based latex adhesives, such as aqueous adhesive No. 20983 from Northwest Adhesives, Minneapolis, Minn.

The type of asphalt used in the asphalt layer 36 is not critical. The asphalt can be any bituminous material such as tars, pitches or asphalts. The asphalt can be any natural or petroleum derived asphalt. The common source of asphalt is the residue or bottoms from the petroleum refining industry which includes those commonly referred to as paving grade, roofer's flux, propane washed and air-blown.

The asphalt can optionally be modified with a polymer to give it improved flexibility during handling, and improved resistance to flow to prevent changes in thickness from top to bottom in the acoustical insulation system. A preferred polymer is a styrene/butadiene copolymer such as Kraton 1101 (31% styrene, 69% butadiene) from Shell Co., Houston, Tex. The weight ratio of asphalt to polymer is preferably between about 6:1 and about 20:1. The polymer can be mixed into the asphalt under high shear at 300° F. (149° C.) to 400° F. (204° C.). Another preferred polymer is formed by copolymerization of styrene-butadiene-styrene (SBS) thermoplastic rubber and styrene monomer. Other polymers that may be useful as asphalt modifiers include ethylene copolymers such as Elvax® 450 (ethylene vinyl acetate copolymer) or Elvaloy® AM (ethylene butylacrylate glycidyl methacrylate terpolymer) both made by Du Pont (Wilmington, Del.), Ultrapave 70® (SBR latex) made by Goodyear, polybutadiene, and polypropylene.

Various fillers can be incorporated into the asphalt layer 36 to increase the mass of the layer and thus reduce the amount of sound transmitted through the sound reflecting barrier. Preferably the filler is selected from calcium carbonate, magnesium silicate, talc, calcium oxide, clay, glass, mica, barium, and mixtures thereof. More preferably the filler is calcium carbonate because it is inexpensive and contributes significant mass. Preferably, the filler is added in an amount within the range of from about 40 to about 80 percent by weight of the total asphalt/filler blend. Additives can also be incorporated into the asphalt layer 40 to provide it with additional properties such as fire retardancy. The type and amount of filler can affect the flexibility of the product. The filler and the asphalt combination preferably has the quality of being relatively easy to cut so that the product can be easily fabricated.

An optional feature of dishwashers or other appliances is an outer member that can act a rigid termination member, which is useful for reflection of noise generated by the appliance. The rigid termination member can be the outside cabinet or shell as is typically employed in portable dishwashers, or it can be a kitchen cabinet wall 39 in the kitchen cabinets 20, as shown in FIG. 2. When a rigid termination member is used, the two-part stratum 32 can optionally be attached to the rigid termination member rather than being attached to the appliance. The two-part stratum can be attached to the kitchen cabinet wall 39 in any suitable manner, such as with an adhesive. Alternatively, it can merely be held in place, in contact with the kitchen cabinet wall 39, with a fastener or other means not shown. The appliance kitchen cabinet wall 39 acts as a rigid termination member because it has little ability to vibrate, and therefore it can prevent or reduce the transmission of unwanted sound through the sidewall. Examples of rigid termination members include certain rigid steel members, wood and masonry materials. The rigid termination member has a high STC to reduce the sound transmitted. Preferably the STC is greater than about 20. It is to be understood that the rigid termination member is optional.

The two-part stratum 32 shown in FIG. 2 is positioned between the kitchen cabinet wall 39 and a broad based fiberglass layer 40, which is designed to absorb sound energy across a broad band of frequencies. The broad based layer 40 need not be made of glass fibers, but can be any additional layer of porous sound absorbing media having a broad based sound absorption quality. The broad based fiberglass layer 40 is optional, but it will provide acoustical absorption for frequencies not absorbed by the two-part stratum 32. Preferably, the broad based fiberglass layer is laminated to the two-part stratum 32 using the adhesive qualities of the asphalt layer 36, but other adhesives can be used. A protective film, such as polyethylene backing layer 42, can be used to enclose or encapsulate the side insulation panel 24 to protect it from moisture or other contaminants.

As shown, the side insulation panel 24 is spaced apart from the dishwasher tub 22, forming a gap 44. It is to be understood, however, that the side insulation panel can be positioned next to and/or adhered to the dishwasher tub. Therefore, although the side insulation panel 24 is shown as being attached to the kitchen cabinet wall 39, the insulation panel can be attached to other parts of the appliance.

Figure 3:
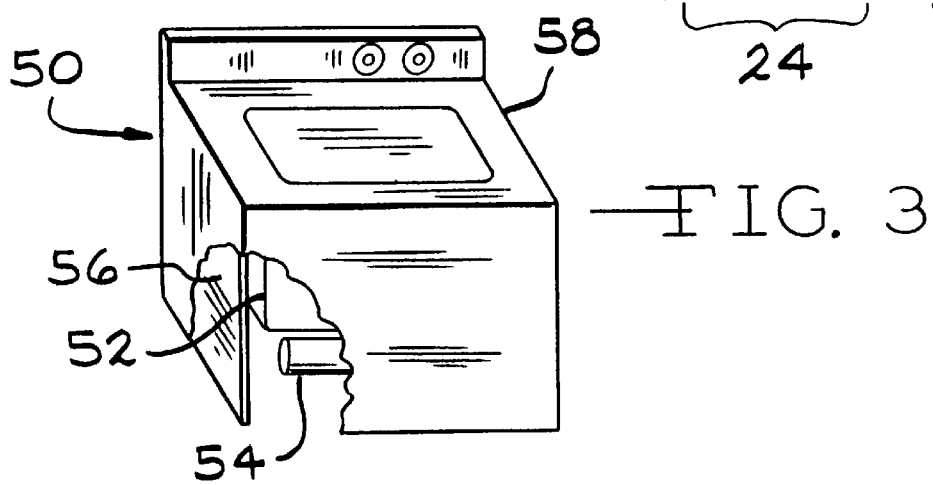
FIG. 3 is a schematic view in perspective of a second embodiment of the acoustically insulated apparatus of the invention.

The acoustically insulated apparatus of the invention can encompass machines other than a dishwasher. As shown in FIG. 3, a clothes washer 50 has a tub 52 and an electric motor 54. The side insulation panel 56 includes a two-part stratum, not illustrated, similar to the two-part stratum 32 of the dishwasher of FIG. 1. Other insulation panels, such as a front insulation panel, are not shown for reasons of clarity. The clothes washer has an exterior cabinet 58.

Figure 4:
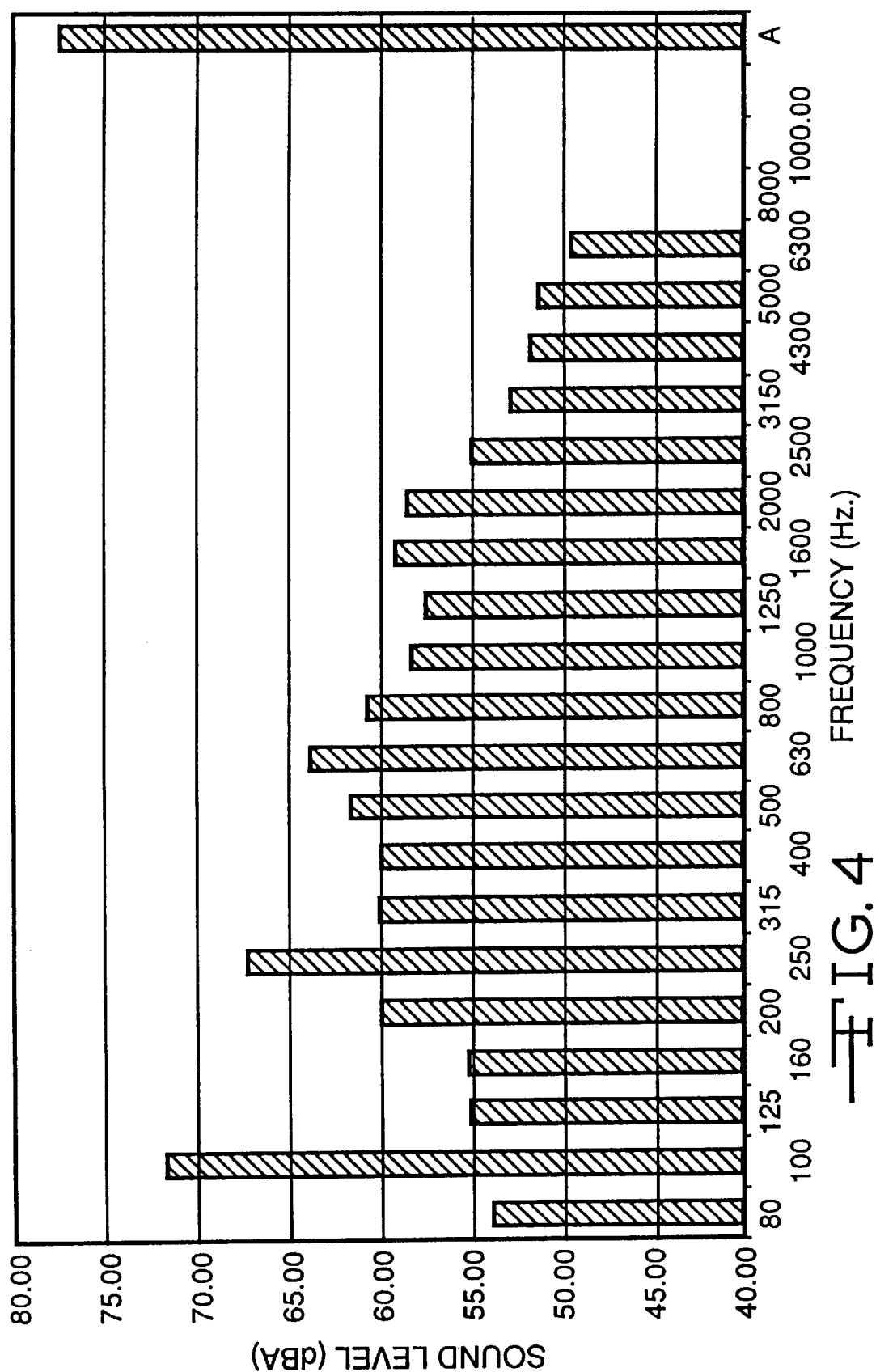
FIG. 4 is a graph illustrating the noise levels at various frequencies for the apparatus of FIG. 3, prior to installation of the acoustical insulation system thereof.

The overall unwanted noise from a machine that generates noise, such as the clothes washer 50 shown in FIG. 3, has different frequencies, spanning a wide frequency band. For example, a typical dishwasher generates audible noise which predominantly has frequencies within the range of from about 30 to about 2000 Hz. However, it has been discovered that at several specific frequencies, or relatively narrow bands of frequencies, the amount of noise is significantly higher than the average, resulting in peaks of acoustical or sound energy. As shown in FIG. 4. the noise level of the washer of FIG. 3 may have a first significant peak at a frequency of about 120 Hz., a second significant peak at a frequency of about 240 Hz., and a third significant peak frequency in a band spanning frequencies of about 500 to about 700 Hz. All of these peaks are referred to as "peak sound frequencies". Thus, the clothes washer of FIG. 3 is shown as having three peak sound frequencies. According to the present invention, the acoustical insulation system can be designed to provide the maximum practical sound absorption for at least one of these peaks, and preferably for at least two of these peaks. The design of the acoustical insulation system machines will thus be different for each different machine, with the insulation system being tailored for the peak sound frequencies of each particular machine.

The two-part stratum of the acoustical insulation system of the invention is designed to provide its maximum sound absorption at the peak frequency of the noise emanating from the noise producing machine. To do this, the two-part stratum is designed with a natural frequency of vibration which approximates the peak frequency of the noise emanating from the machine, such that the asphalt layer transmits sound in a peak frequency range, and generally reflects other frequencies. Accordingly, in the arrangement shown in FIG. 2, acoustical energy that is not in the peak frequency range travels through the broad-based layer 40, such that some of the energy is absorbed therein, and impacts the barrier layer 36 and is reflected back into the broad-based layer 40, where it is further absorbed.

Acoustical energy that is in the peak frequency range travels through the layer 40, such that some of the energy is absorbed, and impacts the barrier layer 36 and is at least partially transmitted through the barrier layer 36 into the insulation layer 34. The acoustical energy then travels through the insulation layer 34, such that some of the energy is further absorbed, reflects off the rigid termination member 39 back through the insulation layer 34, where the energy is further absorbed, is at least partially retransmitted through the barrier layer 36, and travels through the broad-based layer 40. Accordingly, enhanced absorption of energy within the peak frequency range is at least partially accomplished by the fact that at least part of such energy is transmitted through absorption layers four times, as opposed to two times for energy at other frequencies (or two times as opposed to none if the broad-based layer 40 is not used). However, absorption of energy in the peak frequency range is also enhanced by the development of interference within the insulation layer 34. Specifically, sound waves transmitted through the barrier layer 36 and sound waves reflecting off of the termination member 39 set up an interference pattern, such that they at least partially cancel each other and reduce the overall sound energy.

In order to design the two-part stratum 32 so that it has its maximum absorption at the peak sound frequency of the machine, the optimum parameters of the two-part stratum are determined. The density and thickness of the barrier layer and the density, thickness and fiber diameter of the sound absorbing layer[1] are particularly designed such that the barrier layer transmits sound in the peak frequency range. The thickness of the sound absorbing layer 34 is designed particularly to cause interference in the manner described above for the peak frequency range. This is preferably accomplished by calculation using the Mechel modeling technique. The Mechel model allows calculation of frequency response for strata having a layer of porous media and layered films. In the past this model has been used to design acoustical insulation systems having broad based sound absorption quality. The Mechel modeling technique is described in P. F. Mechel, Sound Absorbers, Vol. I, Exterior Sound Fields, Interactions; Vol. II, Internal Sound Fields, Structures, Applications; Vol. III, Computer Programs, S. Hirzel, Publisher, Stuttgart, Germany, 1989, 1991. The optimum design for the two-part stratum, as determined by the Mechel model or by any other method, will include an optimum acoustical energy characteristic for the porous sound absorbing layer which includes thickness and density characteristics. In this respect the two-part stratum is tuned or tonal specific because it is designed to best absorb sound at a peak sound frequency. Likewise, in an optimum design the sound reflecting barrier layer of the two-part stratum will have a specific thickness and density to provide a tonal specific characteristic of the two-part stratum. The effect of such an optimum design is that the two-part stratum exhibits maximum sound absorption at the peak sound frequency of a particular machine.

[1] If a fibrous sound absorbing material is used. If a foam sound absorbing material is used, the density, thickness and porosity of the sound absorbing layer are particularly designed.

The fiber diameter, and the density and thickness of the glass fiber blanket can be varied to modify the sound absorption characteristics of the insulation layer. Preferably the fiberglass insulating material has a relatively low density between about 0.5 pounds per cubic foot (8 kg/m$^3$) and about 10 pounds per cubic foot (160 kg/m$^3$), more preferably between about 0.5 pounds per cubic foot (8 kg/m$^3$) and about 2 pounds per cubic foot (32 kg/m$^3$), and most preferably between about 0.9 pounds per cubic foot (14.4 kg/m$^3$) and about 1.7 pounds per cubic foot (27 kg/m$^3$). For the clothes washer having a peak sound frequency of about 240 Hz., the glass fiber insulation preferably has a density of about 1.7 pounds per cubic foot (27 kg/m$^3$) and a thickness of about 2 cm. The glass fibers in the insulating material preferably have an average diameter between about 3 and about 25 microns, and more preferably between about 3 and about 12 microns.

Typically the density of the asphalt present in the asphalt layer will be within the range of from about 10 to about 150 lb/ft$^3$ (about 160 to about 2400 kg/m$^3$), and preferably at a density of about 110 lb/ft$^3$ (about 1760 kg/m$^3$). Typically, the asphalt layer has a thickness within the range of from about 10 mil to about 280 mils (about 0.25 mm to about 7.11 mm). In one method of making the two-part stratum 32 of the invention, the asphalt layer 36 is applied in a molten form to the fiberglass insulation layer 34 so that the asphalt material can penetrate at least some of the interstices between fibers. This will strongly bond or laminate the asphalt layer to the fiberglass layer. Other means for laminating the asphalt layer 36 to the fibrous insulation layer, such as an adhesive, can also be used. For the clothes washer having a peak sound frequency of about 240 Hz., as illustrated in FIG. 3, the asphalt will preferably have a thickness of about 50 mil (1.25 mm).

EXAMPLE

A clothes washer having the sound frequency characteristics illustrated in FIG. 4 was tested for overall noise levels. Using ANSI S12.31 and a B & K 7680 sound power system, it was determined that the noise emanating from the clothes washer during the agitation cycle had an overall (all frequencies) A-weighted sound level of about 77 decibels. The sound level specifically at 240 Hz. was 69.5 decibels.

A conventional acoustical insulation system was applied to the interior surface of the cabinet of the same clothes washer. The insulation consisted of a single layer of Owens Corning HV 26 fiberglass insulation about 1.0 inches (about 2.54 cm) thick. The insulation had a density of about 1.5 lb/ft$^3$ (about 24 kg/m$^3$). The overall A-weighted sound level from the clothes washer insulated with the conventional insulation during the agitation cycle was measured as being about 73 decibels. The noise level specifically at 240 Hz. was 65.7 decibels.

Then the conventional insulation system was removed from the clothes washer, and an insulation system of the invention was applied to the interior surface of the exterior cabinet of the same clothes washer. The insulation system included a two-part stratum having an Owens Corning TMAT fiberglass insulation layer with a density of about 3.0 lb/ft$^3$ (about 48 kg/m$^3$), a thickness of about ¼ inches (about 0.635 cm), and an average fiber diameter of about 5 microns. The asphalt layer had a thickness of about 50 mils (1.27 mm) and a density of about 12 lb/ft$^3$ (about 197 kg/m$^3$). The asphalt had a ring and ball softening point of 204° C. and a penetration ratio of 15 dmm. The asphalt material was filled with about 50 percent by weight soft clay filler. In addition to the two-part stratum of fiberglass insulation and asphalt, the acoustical insulation system of the invention had an additional layer of fiberglass insulation having a broad based sound absorption quality. This broad band insulation was an Owens Corning CA 25 fiberglass insulation layer with a density of about 1.5 lb/ft$^3$ (about 24 kg/m$^3$), a thickness of about ⅝ inches (about 3.125 cm), and an average fiber diameter of about 5 microns. Under the same testing procedure as above, the noise emanating from the clothes washer during the agitation cycle was measured at an A-weighted sound level of about 71 decibels. The noise level specifically at 240 Hz. was 61 decibels.

In conclusion, an acoustically insulated apparatus according to the present invention, including an acoustical insulation system having the same overall thickness as the conventional acoustical insulation, provided an overall reduction in noise levels for a particular clothes washer of about 6 decibels, and reduction at 240 Hz. of about 8.5 decibels over the uninsulated clothes washer. Further, the apparatus of the invention demonstrated an overall reduction in noise levels of about 2 decibels, and reduction at 240 Hz. of about 4.7 decibels over the conventionally insulated clothes washer.

Figure 5:
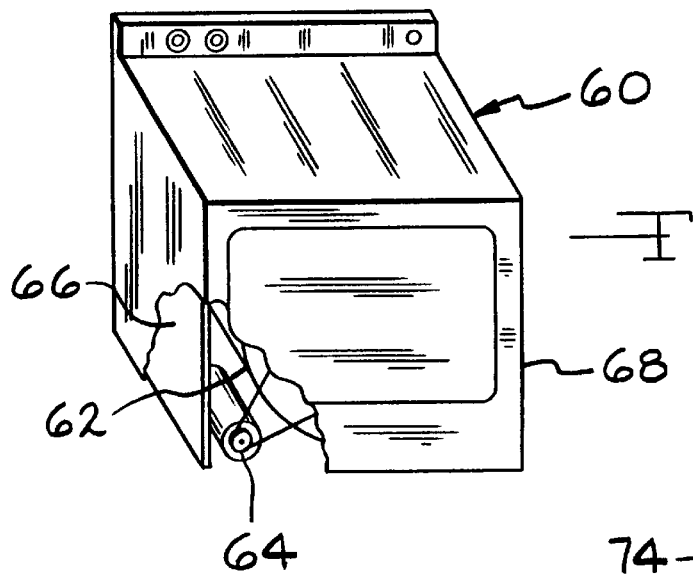
FIG. 5 is a schematic view in perspective of a third embodiment of the acoustically insulated apparatus of the invention.

As shown in FIG. 5, the acoustically insulated apparatus of the invention can encompass a clothes dryer 60. The dryer is provided with a drum 62 and motor 64, and has side acoustical insulation panel 66 of the invention attached to the interior of cabinet 68. Although for purposes of illustration only one insulation panel 66 is shown in the cutaway portion of the drawing, it is to be understood that multiple insulation panels would ordinarily be employed to provide the desired acoustical protection.

Figure 6:
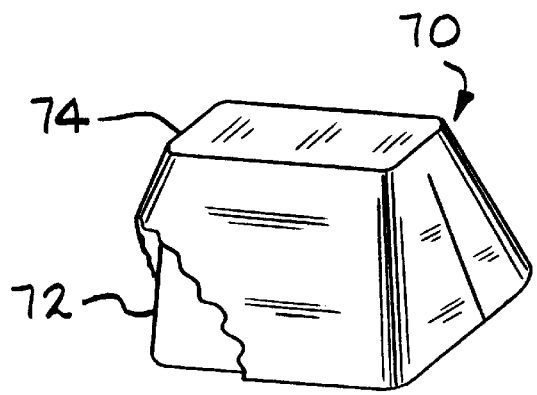
FIG. 6 is a schematic view in perspective of a fourth embodiment of the acoustically insulated apparatus of the invention.

As shown in FIG. 6, the acoustically insulated apparatus of the invention can encompass an air conditioner 70. The air conditioner has a compressor 72 which is provided an acoustical insulation system 74 of the invention. It is to be understood that the apparatus of the invention can encompass any kind of noise producing machine, including not only the appliances and air conditioners shown in the drawings, but also other machines such as dehumidifiers, fans, furnaces, industrial motors, and automobiles. For example, the apparatus of the invention can encompass a dashboard of an automobile to prevent unwanted sound from the vehicle engine from entering the passenger compartment of the vehicle.

Figure 7:
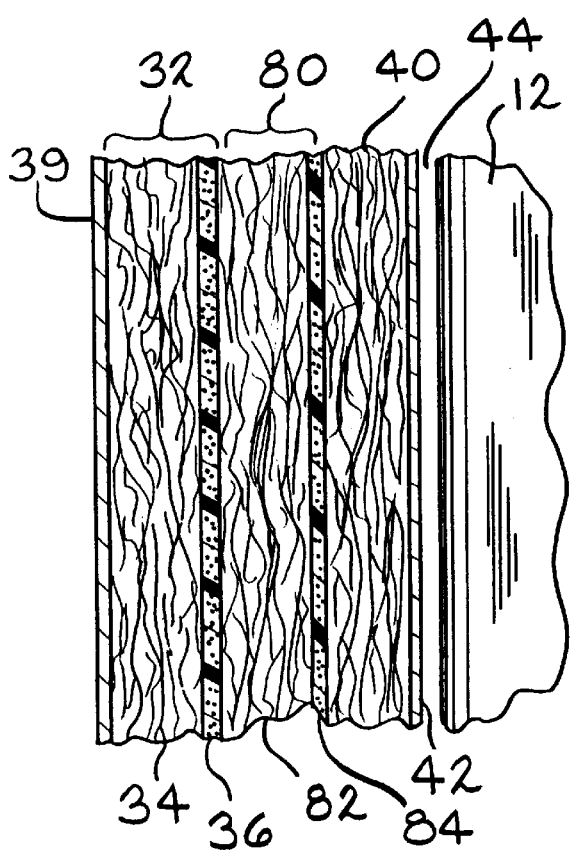
FIG. 7 is schematic cross-sectional view in elevation of a portion of a fifth embodiment of the acoustically insulated apparatus of the invention.

As shown in FIG. 7, the acoustically insulated apparatus can include a second embodiment of the acoustical insulation system of the invention. Specifically, the insulation system can be provided with an additional or second two-part stratum 80 having a second porous sound absorbing media layer, such as a second fiberglass layer 82, and a second sound reflecting barrier layer, such as second asphalt layer 84. The combination of the first and second two-part strata 32, 80 can be designed or tuned to absorb both a first peak frequency and second peak frequency. In this way, the insulation system can be adapted to provide the maximum noise absorption for two peak sound frequencies or frequency bands. For example, for the clothes washer acoustical profile illustrated in FIG. 4, the first and second two-part strata 32, 80 could be designed to capture and attenuate sound having a frequency of about 240 Hz. and sound having a frequency within the range of from about 500 to about 700 Hz. While all of the sound absorbing mechanisms of such a system are not fully understood, it appears at a minimum that the system would act like one large two-part stratum to absorb sound at one of the peak frequencies, and that one of the two-part strata would act independently to absorb sound at the other of the peak frequencies. It is to be understood that any number of two-part strata could be used to handle any number of peak sound frequencies. It is believed that the acoustical insulation system having two two-part strata, as illustrated in FIG. 7, when tested under the same conditions as in the example above, would give an overall reduction in noise level of about 7 decibels over the uninsulated clothes washer, and an overall reduction in noise levels of about 2.5 decibels over the conventionally insulated clothes washer.

The principle and mode of operation of this invention have been described in its preferred embodiment. However, it should be noted that this invention may be practiced otherwise than as specifically illustrated and described without departing from its scope.

What is claimed is:

1. An acoustically insulated apparatus, comprising a machine, a termination member adjacent to said machine and an acoustical insulation system for said machine, wherein said machine generates noise having a peak sound frequency, said insulation system including a two-part stratum having a porous sound absorbing media layer and a sound reflecting barrier layer attached to said porous sound absorbing media layer, and support apparatus for supporting said two part stratum between said termination member and said machine such that said sound reflecting barrier layer is located between said sound absorbing layer and said machine and said sound absorbing layer is between said termination member and said barrier layer, said sound reflecting barrier layer constructed to permit noise at said peak sound frequency to pass therethrough to said porous sound absorbing layer for absorption therein and reflect noise at other frequencies therefrom such that said two-part stratum exhibits maximum sound absorption at said peak sound frequency.

2. The apparatus of claim 1, wherein said barrier layer transmits acoustical energy within a peak frequency range encompassing said peak sound frequency.

3. The apparatus of claim 1, wherein said insulation system further includes an additional layer of sound absorbing media having a broad based sound absorption quality, said additional layer of sound absorbing media being affixed to said barrier layer and positioned between said barrier layer and said machine.

4. The apparatus of claim 1, wherein said sound absorbing layer is a fibrous insulation layer.

5. The apparatus of claim 1, wherein said barrier layer is a layer of asphalt.

6. The apparatus of claim 1, wherein said two-part stratum exhibits maximum sound absorption at a peak sound frequency of about 120 Hz.

7. The apparatus of claim 1, wherein said two-part stratum exhibits maximum sound absorption at a peak sound frequency of about 240 Hz.

8. The apparatus of claim 1, wherein said machine is selected from the group consisting of washers, dryers, dishwashers, air conditioners, dehumidifiers, furnaces, and automobiles.

9. The apparatus of claim 1 wherein said supporter comprises fastening means for affixing said two-part stratum to at least a portion of said machine.

10. An acoustically insulated apparatus, comprising a machine, a termination member adjacent to said machine and an acoustical insulation system for said machine, wherein said machine generates noise having first and second peak sound frequencies, said insulation system including a first two-part stratum including a first sound absorbing media and a first sound reflecting barrier layer attached to said first sound absorbing media and being located between said first sound absorbing layer and said machine, said first sound reflecting barrier layer constructed to permit noise at said first peak sound frequency to pass therethrough and reflect noise at other frequencies therefrom and a second two-part stratum including a second sound absorbing media layer and a second sound reflecting barrier layer attached to said second sound absorbing media layer, said second sound reflecting barrier layer constructed to permit noise at said second peak frequency to pass therethrough for absorption in said second sound absorbing media layer and reflecting noise at other frequencies therefrom, said apparatus including supporting means for supporting said first two part stratum between said termination member and said machine such that said first sound absorbing media is adjacent said termination member and said first reflecting barrier is located between said first sound absorbing media and said machine and said second two part stratum is located between said first two part stratum and said machine such that said second sound reflecting barrier layer is located between said second sound absorbing layer and said machine, wherein said insulation system exhibits maximum sound absorption at said first and second peak sound frequencies.

11. The apparatus of claim 10, wherein said insulation system further includes an additional layer of sound absorbing media having a broad based sound absorption quality, said additional layer of sound absorbing media being affixed to said second barrier layer and positioned between said second barrier layer and said machine.

12. The apparatus of claim 10, wherein said first and second sound absorbing layers are fibrous insulation layers.

13. The apparatus of claim 10, wherein said first and second barrier layers are layers of asphalt.

14. The apparatus of claim 10, wherein said insulation system exhibits maximum sound absorption at a first peak sound frequency of about 240 Hz. and at a second peak sound frequency of between about 500 and about 700 Hz.

15. The apparatus of claim 10, wherein said machine is selected from the group consisting of washers, dyers, dishwashers, air conditioners, dehumidifiers, furnaces, and automobiles.

16. A method of attenuating noise from a machine, said noise having a known peak frequency, the method comprising:

providing a layer of porous sound-absorbing media;

providing a sound reflecting barrier layer formed of a material for which noise at said peak frequency passes through and for which noise at other frequencies is reflected;

attaching said porous sound absorbing layer to said sound reflecting layer to form a two-part stratum;

providing a sound-reflective termination member adjacent to said machine;

attaching said sound-absorbing layer to said termination member such that said two-part stratum is arranged between said termination member and said machine and so that said barrier layer is located between said sound-absorbing layer and said machine, and such that noise passing through said barrier layer is attenuated in said sound-absorbing layer.

17. The method of claim 16, further comprising attaching said barrier layer to said machine.

18. The method of claim 16, wherein said peak frequency is a first peak frequency, said machine has a second peak frequency, said two-part stratum is a first two-part stratum and said material is a first material, said method further comprising:

providing a second two-part stratum wherein the barrier layer is formed of a second material for which noise at said second peak frequency passes through and for which noise at other frequencies is reflected; and attaching said second two-part stratum to said first two-part stratum such that the sound absorbing layer of said second two-part stratum is located between said barrier layer of said first two-part stratum and said machine.

19. The method of claim 16 wherein said sound absorbing layer is fabricated from a fibrous material having a density, a thickness and a fiber diameter which permits sound waves passing through said barrier layer to pass therethrough and to reflect off of said termination member back into said sound absorption layer to contact additional sound waves entering therein through said barrier layer.

20. The method of claim 16 wherein said sound absorbing layer is fabricated from a foam material having a density, thickness and porosity which permits sound waves passing through said barrier layer to pass therethrough and to reflect off of said termination member back into said sound absorption layer to contact additional sound waves entering therein through said barrier layer.

\* \* \* \* \*